No. 625,742. Patented May 30, 1899.
J. CARTIER.
COMBINED FISH AND ANIMAL TRAP.
(Application filed July 7, 1898.)
(No Model.) 2 Sheets—Sheet 1.
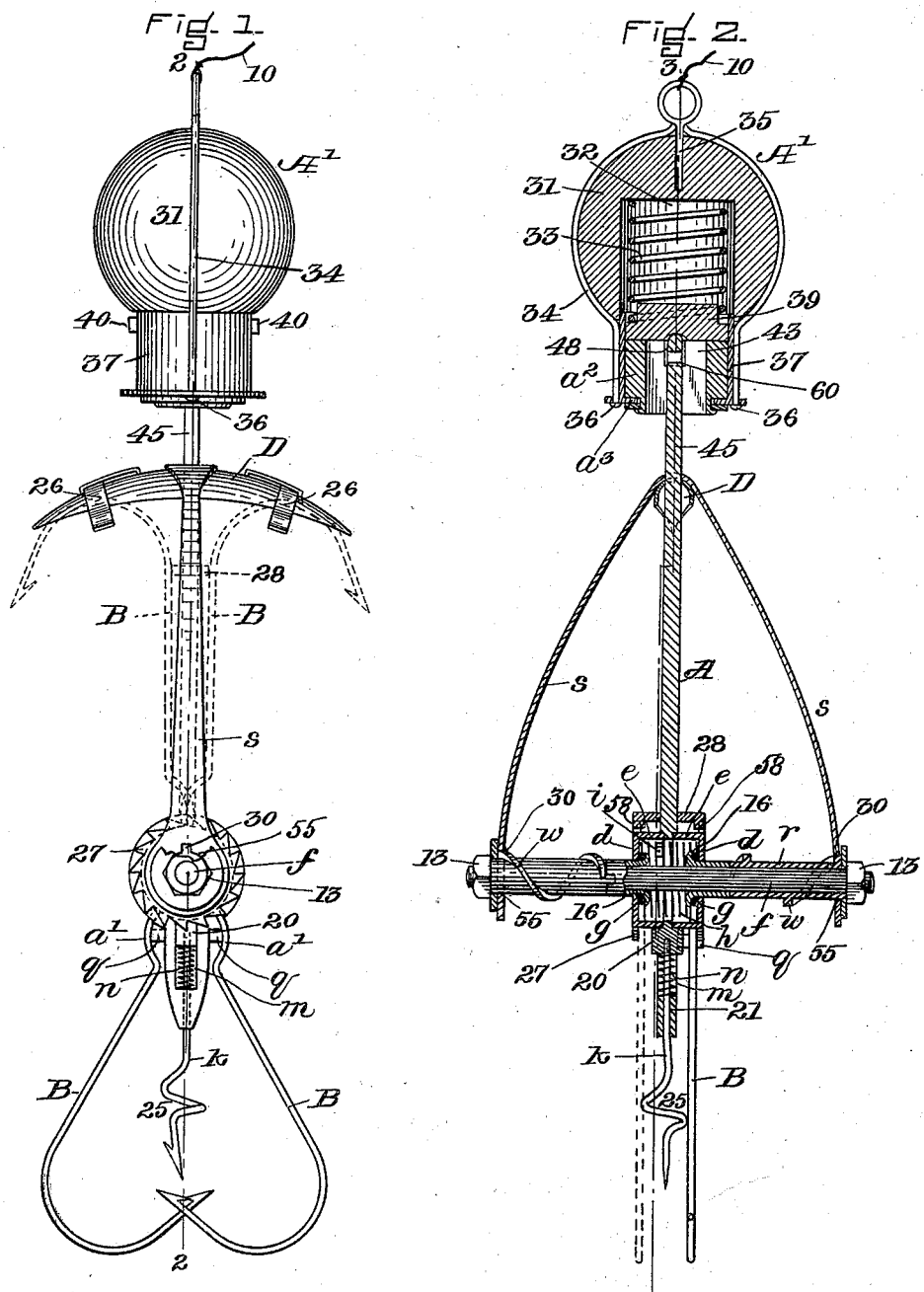
WITNESSES.
A. D. Grover.
Fred E. Dorr.
INVENTOR.
Jacob Cartier
by H. C. Teschemacher
Atty.

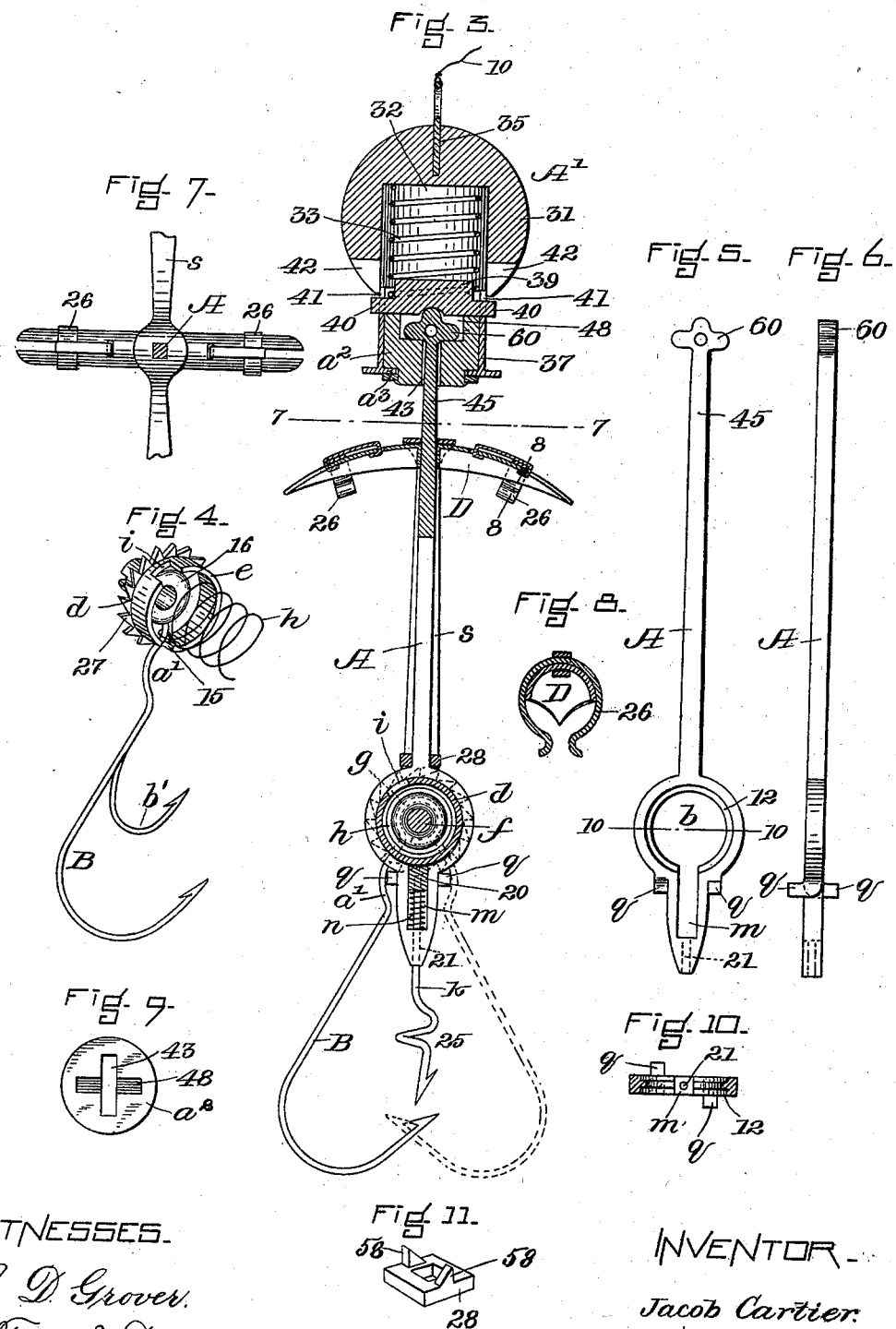

UNITED STATES PATENT OFFICE.

JACOB CARTIER, OF BIDDEFORD, MAINE, ASSIGNOR OF ONE-HALF TO ARTHUR GEORGE PELLETIER, OF SAME PLACE.

COMBINED FISH AND ANIMAL TRAP.

SPECIFICATION forming part of Letters Patent No. 625,742, dated May 30, 1899.

Application filed July 7, 1898. Serial No. 685,345. (No model.)

*To all whom it may concern:*

Be it known that I, JACOB CARTIER, a citizen of the United States, residing at Biddeford, in the county of York and State of Maine, have invented certain Improvements in a Combined Fish and Animal Trap, of which the following is a specification.

My invention relates to a combined fish and animal trap adapted for catching large or small fish and also for trapping animals on land; and my invention consists in certain novel features and combinations of parts, as will be hereinafter fully described, and pointed out in the claims.

In the accompanying drawings, Figure 1 is a side elevation of my improved fish and animal trap. Fig. 2 is a central vertical section of the same on the line 2 2 of Fig. 1. Fig. 3 is a central vertical section on the line 3 3 of Fig. 2. Fig. 4 is a detail in perspective of one of the hook-arms and its hub and actuating-spring. Fig. 5 is a side elevation of the stem of the trap. Fig. 6 is an edge view of the same. Fig. 7 is a horizontal section on the line 7 7 of Fig. 3. Fig. 8 is an enlarged sectional detail on the line 8 8 of Fig. 3. Fig. 9 is a detail to be referred to. Fig. 10 is a horizontal section on the line 10 10 of Fig. 5. Fig. 11 is a detail to be referred to.

In the drawings, A represents a vertical stem or bar which supports the operating parts of the trap and is provided at its upper end with a detachable sinker A', to be hereinafter described, at the upper end of which is a ring or eye to which may be fastened a line 10, by which the trap is to be lowered into the water. The lower end of the stem A is enlarged and provided with a circular opening $b$, forming a ring or annulus, which is recessed or rabbeted on each side at 12 to receive two hubs $d$, each provided with a peripheral flange $e$, Figs. 2 and 4, and free to be rotated on a central pivot-pin $f$, which passes through both hubs and is provided at its ends with nuts 13 to hold said hubs securely in place within the rabbeted edges of the opening $b$.

B B are a pair of spring-actuated hook-arms bent near their upper ends to form offsets $a'$, as shown, and curved inward at their lower ends, where they are provided with barbs, as shown. If desired, each of the hook-arms B may be provided with an additional barbed hook $b'$, as shown in Fig. 4. Each of these hook-arms B is provided at its inner end with an eye $g$, through which passes the pivot-pin $f$, said arm being securely fastened to or connected with one of the hubs $d$, so as to turn therewith, by being dropped into a square notch 15 in its flange $e$, as shown in Fig. 4, the eye $g$ being held in place by turning over thereupon the end of a flange 16, forming part of the hub $d$. This construction enables the hook-arm to be replaced by another when accidentally broken or injured or when an arm of different size is required.

Around the central pivot-pin $f$ is a coiled spring $h$, the opposite ends of which are secured, respectively, to the hubs $d$ $d$, preferably by bending the ends of the spring around the adjacent portions of the two hook-arms, as shown in Fig. 4, whereby as the arms are raised into the position seen dotted in Fig. 1 the spring $h$ will be wound up or tightened to swing them downward when released. The hubs $d$ are each provided at the periphery with a square notch $i$, said notches when the arms are swung upward to set the trap, as shown dotted in Fig. 1, being by the rotation of the hubs in opposite directions brought into line with each other immediately over the upper end of a vertical sliding barbed bait-holding tripping bar or rod $k$, the upper end of which consists of a small detachable rectangular block or piece 20, which enters the notches $i$, thereby holding the arms B B in the raised position shown dotted in Fig. 1 against the resistance of the spring $h$, the trap being then set. The lower end of the stem A is bored out longitudinally to form an aperture 21 to receive the sliding bait-rod $k$ and is provided with a vertical slot $m$, extending into the opening $b$, and between the bottom of this slot and the block 20 said rod is surrounded by a light coiled spring $n$, which tends to force the rod $k$ upward and keeps the block 20 within the notches $i$ until drawn down to spring the trap by a fish or animal seizing the bait on the rod $k$, when the arms B will be released and instantly swung down in the arc of a circle by the spring $h$ into the position shown in Fig. 1, the hooks or barbs entering the fish or animal to catch and hold him securely, as desired. The upper end of the bait-rod $k$ is preferably screwed into the block 20 to enable it to be passed through the vertical guideway 21 at the bottom of the stem A and also to enable it to be easily removed and replaced by another when broken or when a different size or variety of bait-holding hook is desired—for example, a "spoonbait" or one having an artificial fly attached thereto.

The bait-holding rod $k$ is preferably provided with a spirally-twisted portion 25 immediately above its barb or point, as shown, which I consider a very great advantage, as it holds the bait firmly and prevents it from being easily pulled off or detached when seized by a fish or animal. Another advantage is that it gives a life-like appearance to a worm held by said bait-holding device.

The lower end of the stem A is provided with two projections $q$ $q$, which extend outwardly from opposite sides of the same and serve as stops to limit the downward movement of the spring-actuated arms.

To enable the arms B B to be easily swung up to set the trap or disengage the hook from a fish or animal for the purpose of putting on or taking off the bait without injury to the hands, I preferably place upon the pivot-pin $f$, outside each of the hubs $d$, a short sleeve $r$, which rotates upon said pivot-pin, said sleeve $r$ being detachably connected with the adjacent hub by means of coupling projections on the one engaging notches on the other, as shown in Fig. 2, whereby said sleeve may be removed from the pin $f$ when required.

$s$ represents a flat spring bent double and having an aperture at its enlarged top to enable it to fit over the stem A, each branch of said spring having an aperture 55 at its lower end to enable it to freely slip over one of the sleeves $r$. These sleeves are provided, respectively, with spiral ribs $w$, which engage notches 30, Figs. 1 and 2, at the sides of the openings 55 of the spring $s$, whereby as the two branches of said spring are forced toward each other by pressure between the thumb and finger the sleeves $r$ will be turned in opposite directions upon the pin $f$, and thus through the connections described raise or swing up the hook-arms B B against the resistance of the coiled spring $h$ to remove their points from the fish or animal or to afford convenient access to the bait-holding hook or rod to remove or affix the bait. The two branches of the spring $s$ exert force in an outward direction and by their action on the sleeves of the hubs $d$ assist the spring $h$ to swing down the arms B B and also tend to keep the said arms closed together after the trap has been sprung, rendering it impossible for the fish or animal to disengage himself therefrom by forcing them apart. This auxiliary spring device may, however, be dispensed with where it is desired to simplify the construction and reduce the number of parts to a minimum, reliance being placed on the spring $h$ alone to operate the arms to catch the fish or animal and hold him when caught.

At the top of the stem A is preferably secured a curved semitubular guard-plate D, which extends over the hooked ends of the spring-actuated arms B B when raised, and thereby prevents them from catching in seaweed or other substances which would interfere with their free movement when released. At each end of this guard-plate D is a sliding safety-ring 26, open at the bottom to admit the arm B when swung upward, said ring being afterward partially rotated around said guard-plate to engage said arm and lock it to prevent possible injury to the hands from the accidental springing of the trap while handling the same.

Each of the hubs $d$ is provided at its edge with ratchet-teeth 27, and around the stem A is loosely fitted a slide 28, Figs. 2, 3, and 11, which is held up near the top of the stem by the hook-arms B when in their raised position, said slide being provided with two projections 58, which when the slide drops down by its own weight on the release of the hook-arms B engage the ratchet-teeth 27 on the hubs, and thus prevent said arms from being opened or forced apart by the fish in its efforts to escape.

The upper end 45 of the stem A is provided with a head or enlargement 60, which enters the sinker A', as shown in Figs. 2 and 3. This sinker consists of a spherical piece of metal 31, provided with a recess 32, in which is fitted a spiral spring 33. Around the piece 31 fits a wire frame 34, provided with an eye at the top, to which is fastened the fish-line 10, a vertical portion 35, which enters the part 31, which is free to turn axially thereon; and two branches, which extend down outside the part 31 and alongside a tube 37 to a flange, at the bottom of which they are riveted at 36. This tube 37 extends into the bottom of the recess 32 and is supported in place by said wire frame. Within the tube 37 is placed a small cylindrical block 39, provided with lugs 40, which extend through slots 41 in the opposite sides of the tube 37; and in the bottom of the spherical part 31 are formed slots or notches 42, Fig. 3, which by turning said part 31 axially on the vertical portion 35 of the frame 34 may be brought into line to register with the slots 41 of the tube 37 to permit of an upward movement of the block 39. Immediately under the block 39 is placed a second cylindrical block $a^2$, resting on a lip or flange $a^3$ at the bottom of the tube 37 and having a longitudinal aperture 43 for the reception of the upper portion 45 of the stem A, provided with the head 60, which when the portion 45 is forced up through the aperture 43 is brought into contact with and raises the block 39 against the resistance of the spring 33, the lugs 40 of the block 39 then passing out of the slots in the tube 37 and up into the slots 42 of the part 31 previously rotated to bring them opposite to the slots 41. The stem A is now turned axially a quarter of a revolution, causing the lateral projections of the head 60 to be brought over a transverse groove 48 in the upper end of the block $a^2$, Figs. 3 and 9, when by releasing the sinker the spring 33, acting on the block 39, will cause the head 60 to enter the groove 48, which thus prevents it from being drawn out of the sinker, the lugs of the block 39 having been by this movement caused to again pass down into the slots 41 of the tube 37. The part 31 is now turned on its axis to carry its slots 42 out of register with the slots 41, which will prevent the block 39 from being raised by any upward pressure on the stem A, and consequently the parts will be locked securely in place, it being then impossible to withdraw the stem A from the sinker A' until the part 31 has again been rotated to bring its slots 42 into line with the slots of the tube 37, when the head 60 can be raised out of the groove 48 and the stem A rotated into a position to allow said head to be drawn down out of the aperture 43 of the block $a^2$. The above construction allows the sinker A', with the fish-line attached, to be easily removed from the stem A or replaced thereon when required and will save much time hitherto wasted in tying and untying the piece of catgut or fine wire which is usually fastened to the upper portion of a fish-hook.

Instead of making the spherical part 31 of metal it may be made of cork or other flotative material to adapt it to act as a float to keep the trap on the surface of the water instead of serving as a sinker, as previously described, and the top of the stem 45 is provided with a hole or eye to enable the fish-line to be attached thereto when the trap is to be used without the sinker or float.

What I claim as my invention, and desire to secure by Letters Patent, is—

1. A fish and animal trap comprising a central stem or support, a pair of spring-actuated arms provided with hooks and secured to hubs provided with peripheral notches and arranged to rotate in opposite directions on a pivot pin or support at the lower end of said central stem as said arms are swung upward and downward, and the vertically-sliding bait-holding rod and tripping-bar adapted to enter the peripheral notches of said hubs when brought into line therewith, whereby the spring-actuated arms are held in a raised position when the trap is set, substantially as described.

2. In a fish and animal trap, the combination with a central stem having an annular enlargement at its lower end recessed or rabbeted on each side, of a pair of hubs mounted on a pivot-pin and provided with peripheral notches, said hubs fitting within the rabbeted edges of the said annular enlargement and carrying a pair of spring-actuated arms provided with hooks or barbs, and a spring-actuated bait-holding rod and tripping-bar sliding within the lower end of the central stem and adapted to enter the notches in said hubs when brought into line therewith to hold the hook-arms in a raised position and release the same to spring the trap when drawn down by the seizing of the bait, and suitable stops projecting from the lower end of the stem to limit the movement of the hook-arms when released, substantially as described.

3. In a fish and animal trap, the combination with the central stem or support, of the notched hubs carrying the hook-arms and rotating in opposite directions upon a pivot-pin, a single spring coiled around the pivot-pin and having its ends connected with said hubs to simultaneously rotate the same in opposite directions to swing the hook-arms downward, and a bait-holding tripping-bar engaging said hubs to hold the hook-arms in a raised position when the trap is set, substantially as described.

4. In a fish and animal trap, the combination with the central stem or support, of the spring-actuated hook-arms secured to notched hubs rotating on a pivot-pin, said hubs having connected therewith sleeves encircling said pivot-pin and having spiral ribs, a pair of spring-arms secured at their upper ends to the central stem and fitting over the said sleeves and provided with slots for receiving said spiral ribs, whereby the hook-arms may be raised by pressing said spring-arms toward each other, and a sliding bait-holding tripping device adapted to engage said hubs and hold the spring-actuated hook-arms in a raised position when the trap is set, substantially as described.

5. In a fish and animal trap, the combination with the spring-actuated hook-arms and their notched hubs, of a vertically-sliding bait-holding rod provided at its upper end with a detachable block or piece adapted to engage and hold said hubs when the said hook-arms are swung upward to set the trap, substantially as set forth.

6. In a fish and animal trap, the combination with the central stem or support, of the spring-actuated hook-arms and their notched hubs, the bait-holding tripping-bar sliding in a guide at the lower end of said central stem and having a detachable block or piece adapted to enter the notches of the hubs and hold the same when the hook-arms are swung upward, and a spiral spring encircling the bait-holding rod and tending to force the same upward to keep it engaged with the hubs, substantially as described.

7. In a fish and animal trap, the combination with the stem A, and the spring-actuated hook-arms and their hubs, the latter provided with ratchet-teeth, of the slide 28 adapted to move freely on said stem and provided with projections adapted to engage the ratchet-teeth of the hubs to lock the hook-arms when swung down, said slide being supported near the upper end of the stem by said hook-arms when raised to set the trap, substantially as set forth.

8. In a fish and animal trap, the combination with the stem, the spring-actuated hook-arms and the curved guard-plate D, of the sliding safety-rings open at the bottom to admit the hook-arms B when raised, and adapted to be partially rotated on said guard-plate to catch and lock said arms, substantially as set forth.

9. In a fish and animal trap, the combination with the stem A provided at its upper end with a head 60, of the sinker A' consisting of the rotary portion 31 provided with a recess 32 and slots 42 and the spring 33, the wire frame 34, the tube 37 secured thereto and having slots 41, the block 39 with its lugs 40, and the lower block $a^2$ having an aperture 43 for the passage of the upper portion 45 of the stem A and having at its upper end a transverse groove 48 for the reception of the head 60, said rotary portion 31 when turned to carry its slots 42 out of line with the slots 41 of the tube 37, serving to lock the sinker to the stem A, substantially as described.

Witness my hand this 1st day of July, A. D. 1898.

JACOB CARTIER.

In presence of—
GEORGE F. HALEY,
LEROY HALEY.